United States Patent [19]

Shirouzu et al.

[11] Patent Number: 4,862,313

[45] Date of Patent: Aug. 29, 1989

[54] DRIVING APPARATUS FOR DC CIRCUIT BREAKERS

[75] Inventors: Tatsuji Shirouzu; Tatsuo Takahashi; Motoo Sato; Satoshi Mizuno, all of Hitachi, Japan

[73] Assignee: Hitachi, Ltd., Tokyo, Japan

[21] Appl. No.: 281,211

[22] Filed: Dec. 8, 1988

[30] Foreign Application Priority Data

Dec. 11, 1987 [JP] Japan ................................ 62-311983

[51] Int. Cl.[4] ................................................ H02H 2/02

[52] U.S. Cl. ....................................... 361/102; 361/93; 335/19; 335/17.1

[58] Field of Search ........................... 361/87, 93, 102; 335/19

[56] References Cited

U.S. PATENT DOCUMENTS 3,675,177 4/1972 Ellenberger ........................ 335/194
4,000,445 12/1976 Wilson ............................ 361/102 X
4,731,692 3/1988 Dvorak et al. ...................... 361/102

FOREIGN PATENT DOCUMENTS 54-149873 11/1979 Japan .
56-19942 5/1981 Japan .
56-95031 6/1982 Japan .

*Primary Examiner*—Derek S. Jennings
*Attorney, Agent, or Firm*—Antonelli, Terry & Wands

[57] ABSTRACT

A driving apparatus for a DC circuit breaker of reverse current insertion type. The driving apparatus includes a magnetic repulsive coil for instantaneously driving a movable electrode of a vacuum valve directly in an opening direction, and a first coil of capacitor energization type and a second coil for voltage tripping purposes as trip coils for an operating mechanism connected to the movable electrode through a contact spring whereby the magnetic repulsive coil and the first trip coil are respectively energized by capacitors in the case of tripping under faulty conditions and only the second trip coil is energized in the case of tripping under other conditions than faulty conditions. By thus providing the high-speed tripping first coil for the tripping under faulty conditions and the low-speed tripping second coil for the tripping under other conditions than faulty conditions separately to be independent of each other, a mechanical trip-free mechanism is provided thus minimizing the opening stroke due to the magnetic repulsive coil, increasing the life of the vacuum valve and the operating mechanism and enhancing the reliability of the driving apparatus.

11 Claims, 5 Drawing Sheets

DRIVING APPARATUS FOR DC CIRCUIT BREAKERS

BACKGROUND OF THE INVENTION

The present invention relates to improvements in a driving apparatus for a DC circuit breaker of reverse current insertion type and more particularly to such driving apparatus including a high-speed tripping coil and a relatively low-speed tripping coil which are disposed independently of each other thereby providing a mechanical trip-free mechanism.

Basically, a conventional DC current-limiting circuit breaker of reverse current insertion type disclosed, for example in JP-A No. 54-149873 is constructed as shown in FIG. 1. In other words, this circuit breaker includes a breaker unit 2 inserted in series in a main DC line 1, and a series combination of a commutation capacitor 3, a reactor 4 and a thyristor switch 5 for performing switching operation which is connected in parallel with the breaker unit 2. When performing a circuit-breaking operation, an open command is applied to the breaker unit 2, and after the opening of the breaker unit 2, the thyristor switch 5 is turned on so that the discharge current ② from the commutation capacitor 3 charged preliminarily from a charge unit 6 is supplied in the reverse direction to the energization current ① of the breaker unit 2 and thus the sum of the currents ① and ② flowing through the breaker unit 2 develops a point of zero. As a result, the arc of the breaker unit 2 is extinguished and the main line current commutates to the commutation capacitor 3, thereby completing the current-limiting process.

While it is necessary to open the breaker unit 2 at a high speed and to cause the commutation capacitor 3 to discharge a high-frequency current in order to break any short-circuit current by the current-limiting action, it has been well known that a vacuum circuit breaker ensuring a satisfactory dielectric strength and an excellent high-frequency current breaking performance with a small opening stroke is suitable for the breaker unit 2, and also it has been well known that a magnetic repulsive coil is suitable for use as the device for opening the breaker unit at a high speed in a short period of time.

By way of example, a circuit breaker comprising a vacuum circuit breaker and employing a magnetic repulsive coil as a high-speed tripping device is constructed as shown in FIG. 2 as disclosed in Japanese Patent Publication No. 56-19942. In other words, it is so constructed that where it is desired to effect the tripping, the energization of a magnetic repulsive coil 7 causes a magnetic repulsive force between it and a short-circuit plate 8 arranged opposite thereto so that a rod 9 connected to the short-circuit plate 8 is moved in the downward direction indicated by an arrow and a movable-side electrode 10 of the vacuum circuit breaker is separated from a fixed-side electrode 11 to move in the opening direction until the movable-side electrode 10 reaches the most-remote maximum stroke position thereby holding the movable-side electrode 10 in the open position by a hook 13 against a closing spring 12 tending to force the movable-side electrode 10 back in the closing direction. In other words, FIG. 2 shows the closed condition of the switch.

This conventional technique is disadvantageous in that basically the construction of a mechanical trip-free mechanism for effecting a breaking operation in preference to the closing operation is not possible due to the open condition being mechanically held by the hook 13, that a greater opening stroke than is necessary is required for ensuring a satisfactory breaking performance and insulating performance due to the engagement of the hook 13, that the input energy to the magnetic repulsive coil 7 is increased with the resulting increase in the burden on the bellows of the vacuum valve, that the high-speed driving involving the operation of the magnetic repulsive coil 7 is performed for every opening operation with the resulting increased stress and increased impact force thereby decreasing the life of the mechanical system on the whole and so on.

SUMMARY OF THE INVENTION

It is the primary object of the present invention to provide a driving apparatus for a DC circuit breaker, which is designed so that a high-speed tripping coil for tripping under faulty conditions and a low-speed tripping coil for tripping under other conditions than faulty conditions are separately provided independently of each other so as to provide a mechanical trip-free mechanism and to minimize the opening stroke due to a magnetic repulsive coil.

It is another object of the invention to provide such driving apparatus so constructed that a high-speed driving unit is operated only during the tripping under faulty conditions requiring high-speed tripping, thereby increasing the life of a vacuum valve and an operating mechanism and increasing the reliability of the apparatus.

To accomplish the above objects, in accordance with the invention there is thus provided a driving apparatus for a DC circuit breaker which includes a magnetic repulsive coil for instantaneously driving the movable electrode of a vacuum valve directly in an opening direction, and a first coil of capacitor energization type and a second coil for voltage tripping purposes as the trip coils for an operating mechanism connected to the movable electrode of the vacuum valve through a contact spring whereby the magnetic repulsive coil and the first trip coil are simultaneously energized by capacitors for tripping under faulty conditions and only the second trip coil is energized for tripping under other conditions than faulty conditions.

A mechanical trip-free mechanism is provided by connecting the movable electrode with a separate operating mechanism through the contact spring.

Since the duration time of a driving force produced by the magnetic repulsive coil is as short as about 100 $\mu s$ and since the movable electrode is forced back in the closing direction by the force of the contact spring after the completion of an opening operation, the movable electrode must be pulled back in the opening direction by the separate operating mechanism before the succeeding reclosing. In the case of an opening operation by the ordinary voltage trip coil, about 20 to 30 ms is required before the initiation of a pull back operation and the reclosing cannot be prevented. Thus, simultaneously with the magnetic repulsive coil, the capacitor energization-type first coil is energized by the capacitor thus reducing the pull-back operation starting time to as short as several ms and this makes it possible to reduce the opening stroke by the magnetic repulsive coil to the minimum stroke required for the extinction of an arc.

Also, under other conditions than fault conditions where no high-speed tripping is required, only the voltage-tripping second coil is energized thus eliminating the operation of the high-speed driving unit.

BRIEF DESCRIPTION OF THE DRAWINGS

Preferred embodiments of the present invention will now be described in conjunction with the accompanying drawings.

DESCRIPTION OF THE PREFERRED EMBODIMENTS

Preferred embodiments of the present invention will now be described in detail with reference to the drawings.

Figure 1:
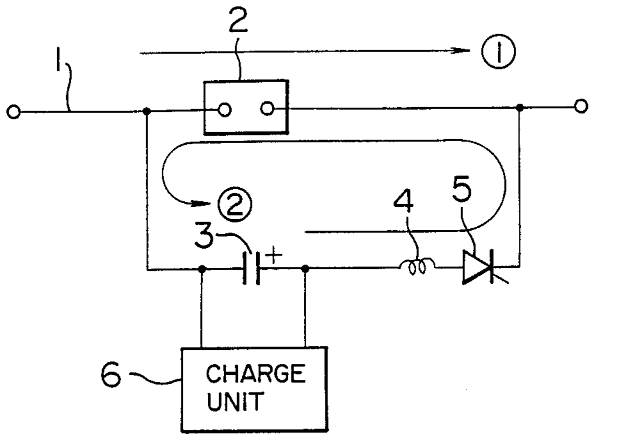
FIG. 1 PRIOR ART
FIG. 1 is a circuit diagram of a conventional DC circuit breaker.
Figure 2:
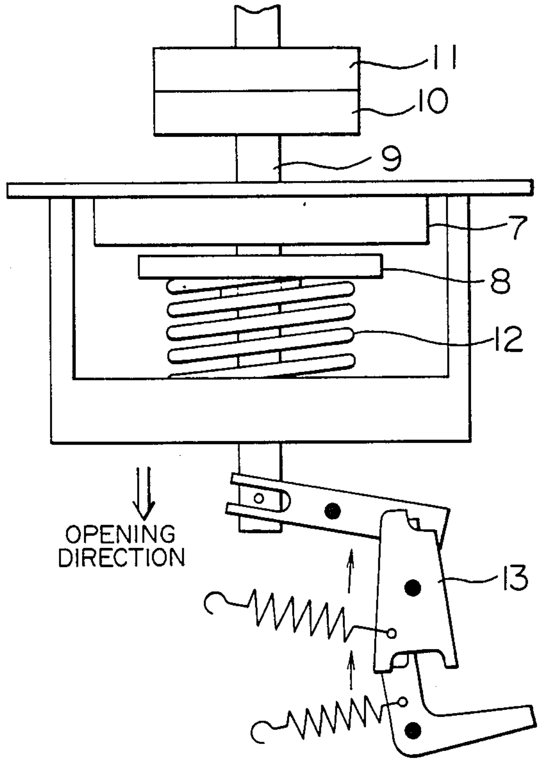
FIG. 2 PRIOR ART
FIG. 2 is a schematic diagram showing a part of the operating mechanism of the conventional DC circuit breaker.
Figure 3:
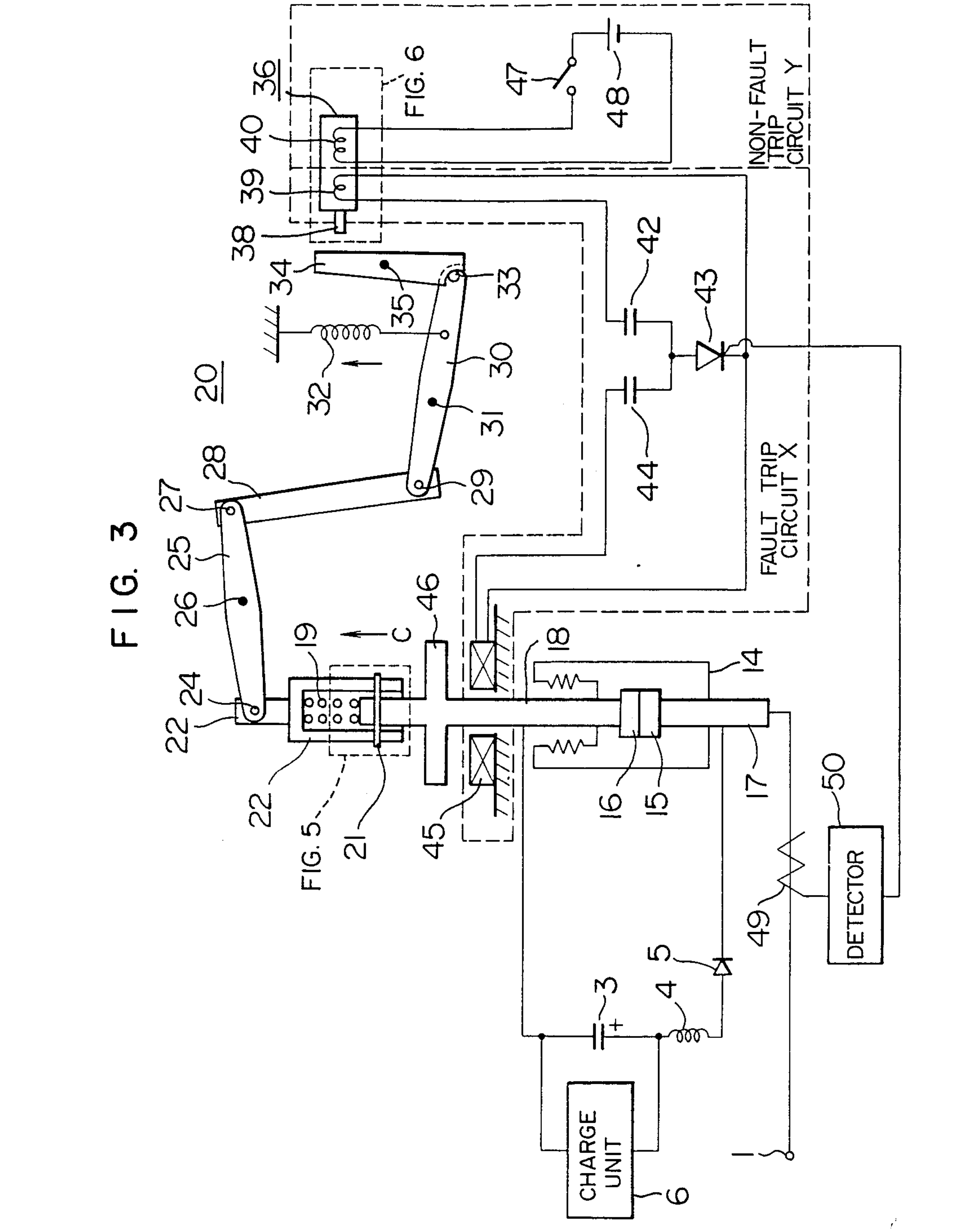
FIG. 3 is a schematic diagram of a driving apparatus according to an embodiment of the invention showing the mechanism of the breaking system when a DC circuit breaker is in the closed position.
Figure 4:
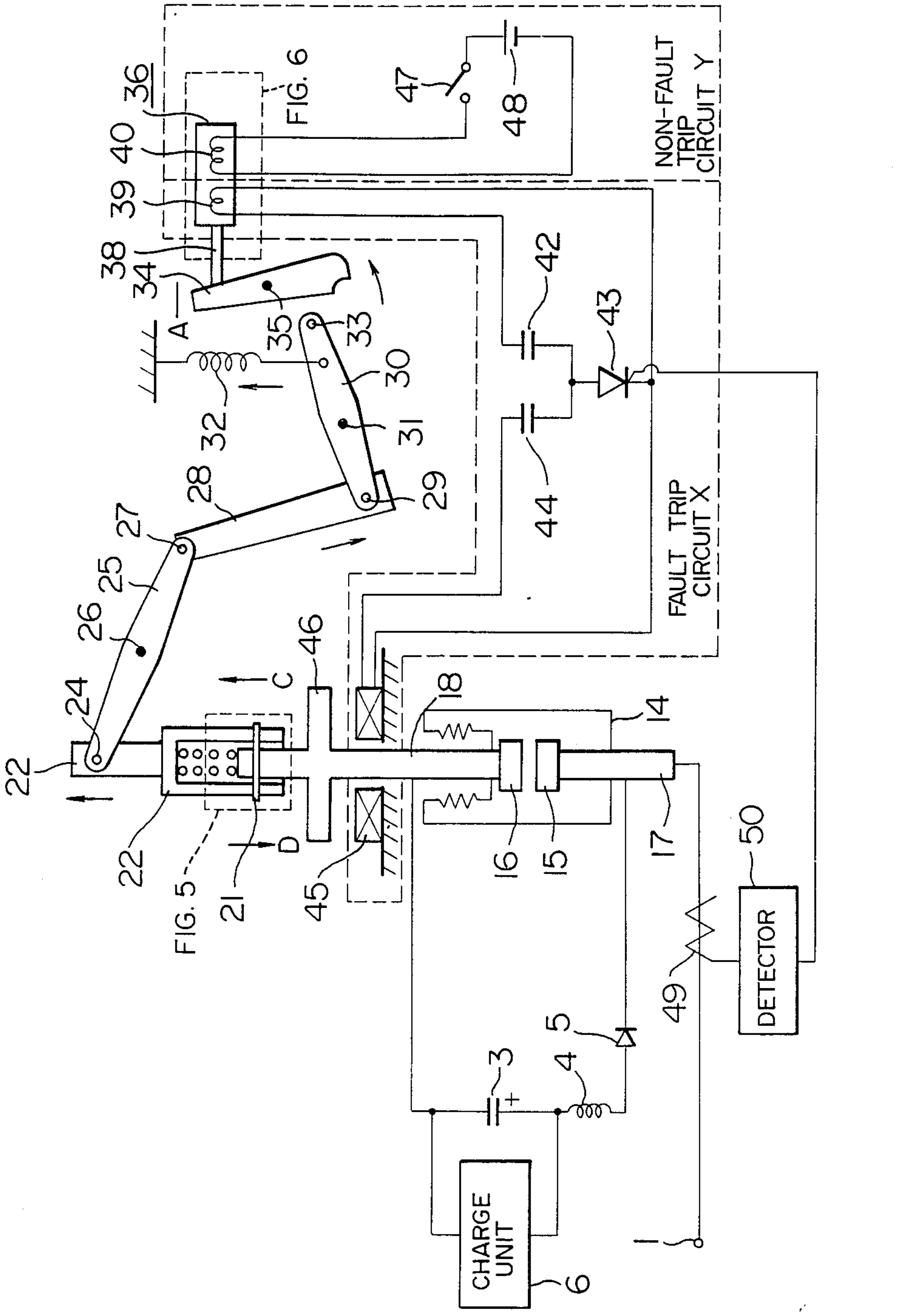
FIG. 4 is a schematic diagram showing the mechanism of the closing system when the DC circuit breaker is in the open position in FIG. 3.
Figure 5:
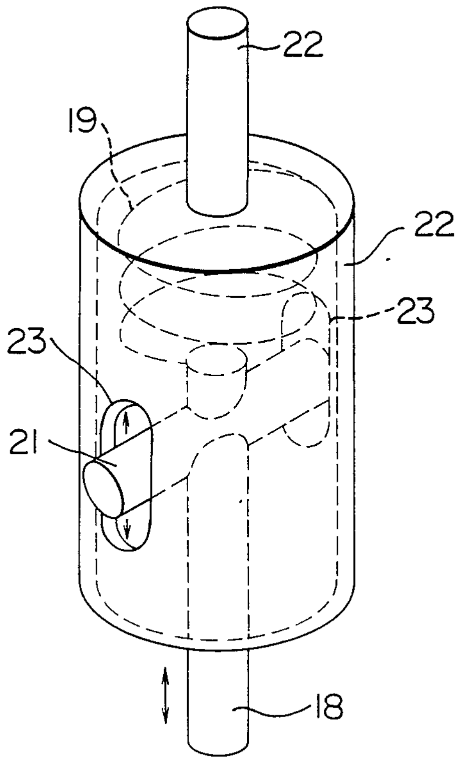
FIG. 5 is a detailed view of the operating rod shown in FIGS. 3 and 4.

FIG. 3 is a schematic diagram of a driving apparatus for a DC circuit breaker constituting an embodiment of the invention showing the mechanism of the breaking system when the DC circuit breaker is in the closed position, and FIG. 4 is a similar schematic diagram showing the mechanism of the closing system when the DC circuit breaker is in the open position. FIG. 5 is a detailed view of the operating rod shown in FIGS. 3 and 4.

In FIGS. 3 and 4, a pair of stationary electrode 15 and movable electrode 16, forming a breaker unit, are arranged opposite to each other within a vacuum valve 14 and rods 17 and 18 are each extended from the back of one of these electrodes to the outside of the vacuum valve 14. The stationary-side rod 17 is fixed. The movable-side rod 18 is connected to an operating mechanism 20 through a contact spring 19.

The operating mechanism 20 is constructed as follows. As shown in FIG. 5, disposed at the other end of the movable-side rod 18 is a pin 21 which is inserted into a pair of elongated holes 23 formed in an operating rod 22, thereby connecting the movable-side rod 18 and the operating rod 22. The contact spring 19 is mounted inside the operating rod 22. The pin 21 is movable within the elongated holes 23 in response to the compressive force of the contact spring 19. The terminating end of the operating rod 22 is connected to a first link 25 through a pin 24, and the first link 25 is pivotable about a first fixed pin 26 attached thereto. This pivotal motion is transmitted to a second link 28 connected to the other end of the first link 25 through a pin 27. The other end of the second link 28 is connected to a third link 30 through a pin 29. A main shaft 31 and a breaking spring 32 are attached to the third link 30. The third link 30 is pivotable about the main shaft 31 so that an energy is stored in or released from the breaking spring 32. The main shaft 31 is provided with means for operating an electric motor (not shown) so as to store in or release an energy from a closing spring which is not shown. Disposed at the other end of the third link 30 is a pin 33 which is engaged with a final lever 34. The final lever 34 is supported on a second fixed pin 35 so as to pivot about it. This pivotal motion is provided by a trip device 36 which presses the final lever 34.

Figure 6:
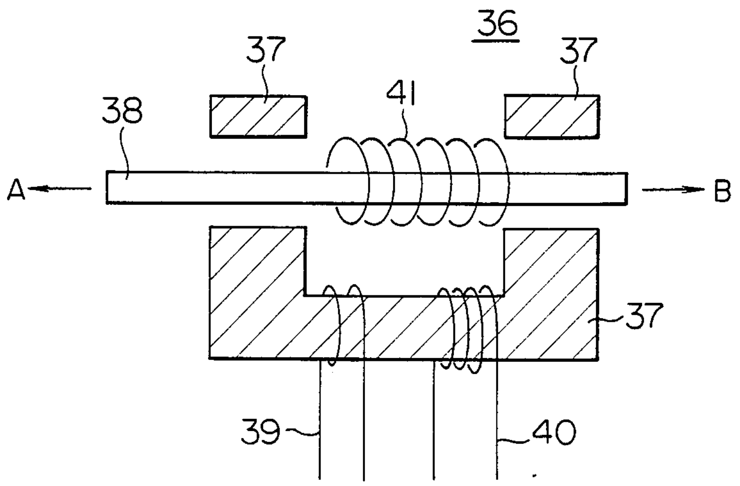
FIG. 6 is a detailed view of the trip device shown in FIGS. 3 and 4.

As shown in FIG. 6, the trip device 36 includes a piston rod 38 disposed inside an iron core 37 and first and second coils 39 and 40 wound on the outside of the core 37. Thus, when the coils 39 and 40 are energized, the piston rod 38 presses the final lever 34 in the direction of an arrow A and the final lever 34 is disengaged with the pin 33 as shown in FIG. 4. When the coils 39 and 40 are deenergized, the piston rod 38 is pressed in the direction of an arrow B by a spring 41 as shown in FIG. 6, so that the main shaft 31 is turned clockwise and the final lever 34 is also turned clockwise thus restoring the initial condition shown in FIG. 3 and thereby preforming an operation reverse to the previous one. The first coil 39 forms a fault trip circuit X in which a capacitor 42 is connected to a thyristor 43 and a capacitor 44 is connected to a magnetic repulsive coil 45. The magnetic repulsive coil 45 is arranged on the movable-side rod 18 and a short-circuit plate 46 is formed halfway on the movable-side rod 18 in opposition to the magnetic repulsive coil 45. The second coil 40 forms a non-fault trip circuit Y including a switch 47 and a DC power supply 48.

Note that an overcurrent flowing in a current transformer 49 is detected by a detector 50 to turn on the thyristor 43.

Next, the operation of the operating mechanism 20 shown in FIGS. 3 and 4 will be described.

In the case of tripping under faulty conditions, in FIG. 3, when an overcurrent flowing in the vacuum valve 14 is detected by the current transformer 49 so that the detector 50 is operated to apply a breaking command to the thyristor 43, the thyristor 43 is turned on and thus the magnetic repulsive coil 45 and the first coil 39 are simultaneously energized by the capacitors 44 and 42, respectively. As a result, a magnetic repulsive force is instantaneously produced between the magnetic repulsive coil 45 and the short-circuit plate 46 so that the movable electrode 16 connected directly to the short-circuit plate 46 through the movable-side rod 18 is driven in the opening direction of an arrow C while causing the contact spring 19 to store an energy and after reaching the maximum separation point the movable electrode 16 is forced back in the closing direction of an arrow D by the compressive force of the contact spring 19 as shown in FIG. 4.

On the other hand, when the first coil 39 is energized, after the expiration of several ms the piston rod 38 presses the final lever 34 so that the final lever 34 is disengaged with the pin 33 and the stored energy in the breaking spring 32 is released. Thus, the movable electrode 16 is again pulled back in the opening direction indicated by the arrow C and held in the open position shown in FIG. 4. This produces a great effect of increasing the breaking speed by the first coil 39.

In the case of tripping under other conditions than faulty conditions, when a breaking command is applied, the operating switch 47 is closed manually so that the second coil 40 is energized by the DC power supply 48 and the piston rod 38 presses the final lever 34, thereby disengaging the final lever 34 with the pin 33. Thus, the movable electrode 16 is driven in the opening direction by the force of the breaking spring 32 and held in the open position shown in FIG. 4.

Figure 7:
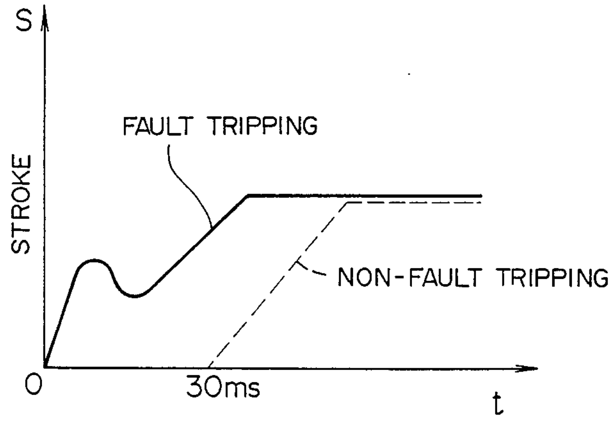
FIG. 7 is a stroke characteristic diagram of the driving apparatus shown in FIGS. 3 and 4.

With the operation described above, the resulting stroke S versus time t characteristic of the movable electrode 16 will now be described with reference to FIG. 7.

While, in the case of tripping under faulty conditions, the opening is effected instantaneously by the instantaneous force due to the magnetic repulsive force thus forcing the electrode 16 back in the closing direction indicated by the arrow D by the contact spring 19, the first coil 39 for the operating mechanism 20 is energized by the capacitor 42 so that the operation of pulling the electrode 16 back in the opening direction indicated by the arrow C is effected before the reclosing of the breaker unit. In the case of tripping under other conditions than faulty conditions, the breaker unit need not be opened at high speed and so the second coil 40 for the operating mechanism 20 is energized by a voltage, thus opening the breaker unit at a relatively low speed only by the force of the breaking spring 32.

While, in the foregoing description, the trip device 36 comprises the first and second coils 39 and 40 to reduce the frequency of capacitor discharge during the tripping under non-faulty conditions, the same effect can be obtained by constructing such that the second coil 40 is eliminated and only the first coil 39 is energized during the tripping under non-faulty conditions.

Also, while in the above-described construction, the magnetic repulsive coil 45 and the first coil 39 are respectively energized by the separate capacitors 44 and 42, it is possible to modify the specifications of these coils and thereby to connect the capacitors 42 and 44 in parallel or in series.

While, in the above-described embodiment, at least the pair of stationary electrode 15 and movable electrode 16, forming the breaker unit, are arranged within the vacuum valve 14, a gas circuit breaker, air circuit breaker or oil circuit breaker may be used in place of the vacuum valve 14.

From the foregoing description it will be seen that in accordance with the present invention, the following great effects, for example, can be obtained by virtue of the provision of the high-speed trip coils 39 and 45 and the relatively low-speed trip coil 40 independently of each other:

① The switching between the high-speed tripping and the low-speed tripping can be effected as desired.

② The mechanical trip-free mechanism is provided.

③ The opening stroke can be minimized by means of the magnetic repulsive coil 45 for high-speed tripping purposes.

④ Since the high-speed driving unit is operated only during the tripping under faulty conditions requiring the high-speed tripping and the high-speed driving is not effected under non-faulty conditions, it is possible to ensure reduced damages to the operating mechanism 20 and the vacuum valve 14 and increase the reliability and mechanical life of the driving apparatus.

We claim:

1. In a DC circuit breaker of reverse current insertion type wherein a preliminarily charged capacitor is connected to a breaker unit through a switch whereby a capacitor discharge current opposite in polarity to a main circuit current is supplied to breaker contacts to forcibly develop a current zero point and thereby to effect a current-limiting breaking, a driving apparatus comprising:

a vacuum valve used as said breaker contacts;

at least one pair of stationary and movable electrodes oppositely arranged within said vacuum valve so as to come into and out of contact with each other;

a pair of rods each thereof being fastened to a back of one of said electrodes to extend to the outside of said vacuum valve;

a magnetic repulsive coil mounted halfway on said movable-side rod to move said movable-side rod in an opening direction;

an operating mechanism connected to said movable-side rod through a contact spring contacting with said movable-side rod;

trip coil means engaged with said operating mechanism and adapted to be energized to release said engagement to open said breaker unit;

a fault trip circuit for simultaneously energizing said trip coil means, said magnetic repulsive coil and capacitors; and a non-fault trip circuit for operating a switch connected to said trip coil means to energize said trip coil means to open said breaker unit.

2. A driving apparatus according to claim 1, wherein said trip coil means comprises a pair of separate trip coils respectively associated with said fault trip circuit and said non-fault trip circuit.

3. In a DC circuit breaker of reverse current insertion type wherein a preliminarily charged capacitor is connected to a breaker unit through a switch whereby a capacitor discharge current opposite in polarity to a main circuit current is supplied to breaker contacts to forcibly develop a current zero point and thereby to effect a current-limiting breaking, a driving apparatus comprising:

a vacuum valve used as said breaker contacts;

at least one pair of stationary and movable electrodes oppositely arranged within said vacuum valve so as to come into and out of contact with each other;

a pair of rods each thereof being fastened to a back of one of said electrodes to extend to the outside of said vacuum valve;

a magnetic repulsive coil mounted halfway on said movable-side rod to move said movable-side rod in an opening direction;

an operating mechanism connected to said movable-side rod through a contact spring contacting with said movable-side rod;

a trip coil engaged with said operating mechanism and adapted to be energized to release said engagement and thereby to open said breaker unit; and a fault trip circuit for simultaneously energizing said trip coil, said magnetic repulsive coil and capacitors.

4. In a DC circuit breaker of reverse current insertion type wherein a preliminarily charged capacitor is connected to a breaker unit through a switch whereby a capacitor discharge current opposite in polarity to a main circuit current is supplied to breaker contacts to forcibly develop a current zero point and thereby to effect a current-limiting breaking, a driving apparatus comprising:

a valve used as said breaker contacts;

at least one pair of stationary and movable electrodes oppositely arranged in said valve so as to come into and out of contact with each other;

a pair of rods each thereof being fastened to a back of one of said electrodes to extend to the outside of said valve;

a magnetic repulsive coil mounted halfway on said movable-side rod to move said movable-side rod in an opening direction;

an operating mechanism connected to said movable-side rod through a contact spring contacting with said movable-side rod;

trip coil means engaged with said operating mechanism and adapted to be energized to release said engagement to open said breaker unit;

a fault trip circuit for simultaneously energizing said trip coil means, said magnetic repulsive coil and capacitors; and a non-fault trip circuit for operating a switch connected to sad trip coil means to energize said trip coil means and thereby to open said breaker unit.

5. A driving apparatus according to claim 4, wherein gas is sealed in said valve.

6. A driving apparatus according to claim 4, wherein air is sealed in said valve.

7. A driving apparatus according to claim 4, wherein oil is sealed in said valve.

8. In a DC circuit breaker of reverse current insertion type wherein a preliminarily charged capacitor is connected to a breaker unit through a switch whereby a capacitor discharge current opposite in polarity to a main circuit current is supplied to breaker contacts to forcibly develop a current zero point and thereby to effect a current-limiting breaking, a driving apparatus comprising:

a valve used as said breaker contacts;

at least one pair of stationary and movable electrodes oppositely arranged within said valve so as to come into and out of contact with each other;

a pair of rods each thereof being fastened to a back of one of said electrodes to extend to the outside of said valve;

a magnetic repulsive coil mounted halfway on said movable-side rod to move said movable-side rod in an opening direction;

an operating mechanism connected to said movable-side rod through a contact spring contacting with said movable-side rod;

a trip coil engaged with said operating mechanism and adapted to be energized to release said engagement and thereby to open said breaker unit; and a fault trip circuit for simultaneously energizing said trip coil, said magnetic repulsive coil and capacitors.

9. A driving apparatus according to claim 8, wherein gas is sealed in said valve.

10. A driving apparatus according to claim 8, wherein air is sealed in said valve.

11. A driving apparatus according to claim 8, wherein oil is sealed in said valve.

* * * * *